June 15, 1937.  C. E. RIFE  2,083,867
VEGETABLE WASHING MACHINE
Filed Aug. 11, 1934

Inventor
Charles E. Rife
By H. H. Snelling
Attorney

Patented June 15, 1937

2,083,867

UNITED STATES PATENT OFFICE 2,083,867

VEGETABLE WASHING MACHINE

Charles E. Rife, Baltimore, Md., assignor to The Sinclair-Scott Company, Baltimore, Md.

Application August 11, 1934, Serial No. 739,482

3 Claims. (Cl. 146—194)

This invention relates to vegetable washing machines for cleaning such products as corn, peas, spinach, beans, etc., and to remove from these vegetables broken pieces and other undesirable or foreign matter, for example, the chaff from near the base of whole grains of corn, splits and skins from peas, cut seeds from cut string beans, and sand from spinach.

The principal object of the present invention is the provision of a vegetable washing machine combining a sieve in which the rods are spaced with extreme accuracy and stability and thru which screen a clear apron of water may be discharged in a film or curtain rather than in a jet or spray. The combination of these two desirable features gives a particularly satisfactory vegetable washing machine.

In preparing vegetables for canning the maximum proportion of such pieces as will detract from the appearance of the food should be removed, for example, when string beans are cut it is impossible to prevent the knives from cutting the bean or seed within the pod and should these cut pieces be present in the canned product the sales value is reduced altho the food value is not lessened. It is also the custom to remove from peas all of the split pieces and in the case of corn the chaff near the base of the grain or corn should obviously be removed prior to canning. It is old in the art to desire to remove these pieces and such foreign substances as may be present, such as dirt or grit, but this has been made very difficult to achieve because of the inability to provide accurate spacing of the sieve mesh plus a proper stream of water. When it be attempted to wind the rod of the sieve in a helix and to solder cross bars it has been found from long practical experience that the variation due to the necessary heat and the rapidity with which heat is carried thru the brass or bronze bars, that the spacing will either be too close to remove all of the undesired material or will be too wide and will pass some of the vegetables which it is desired to keep. Furthermore, as for example in the case with spinach, a ragged spray will tear or pierce but will not clean the vegetable but a thin curtain or sheet of water will clean the spinach excellently. The ragged spray, in the case of corn, for example, will remove only a part of the chaff whereas the substantially solid curtain of water will permit thorough cleansing of the corn.

In the present device the curtain of water is provided by using a number of baffles secured directly to the water pipe and having a curved surface preferably highly machined and the retaining wall of the sieve is given the required accuracy and stability by snugly fitting the rods in drilled holes in the brass rings thus avoiding all use of heat. The use of heat is objectionable not only because of loss of accuracy but because of loss of stability as it has been found commercially impossible to secure the brass rods in place while soldering, brazing, etc., so that they will not break away, without sacrificing the accuracy which is so essential. In the present method the final variation between slits is as little as a thousandth of an inch.

In the drawing:—

Figure 1:
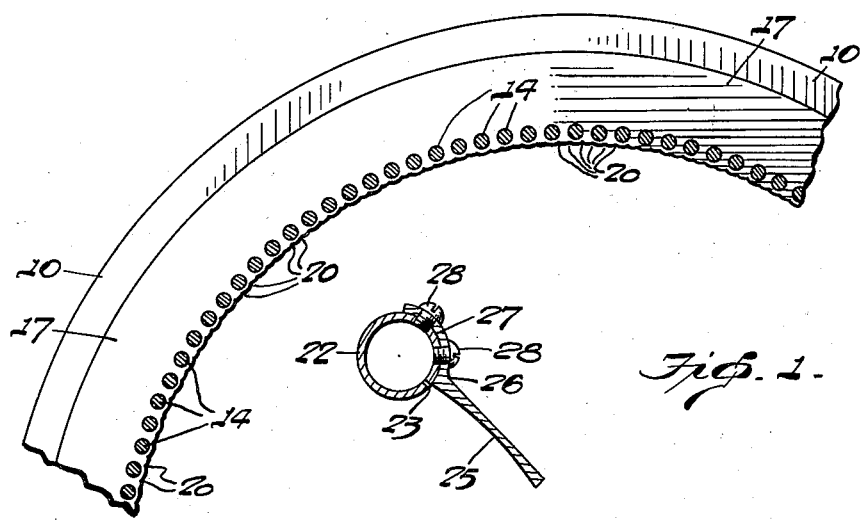
Figure 1 is a radial section thru a sieve and its water pipe.
Figure 2:
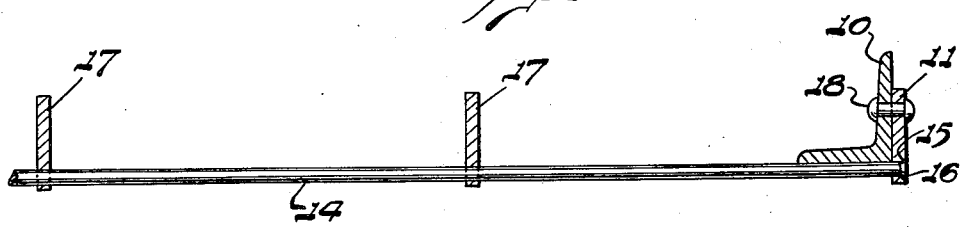
Figure 2 is an axial section taken near the upper right hand corner of the sieve.

While the present invention is not limited in any way to size, it might be stated that the usual dimensions of a sieve embodying the present invention is from four to six feet in axial length and roughly about thirty inches in diameter. At the ends of the sieve are two angle iron rings such as 10 to which is secured the proximate outside ring such as 11 (Figure 2) and between the two rings 11 extend a plurality of hard bronze rods 14 which are preferably anchored in the outside rings 11 by contersinking the ring as at 15, filling the countersunk end with solder as indicated at 16, and sweating the rod in place.

Figure 3:
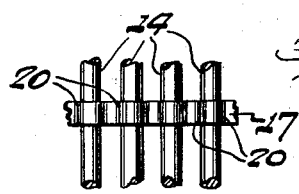
Figure 3 is a view looking edgewise at a retaining ring looking from the axis.
Figure 4:
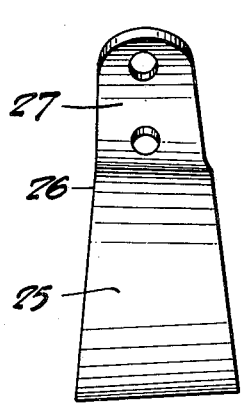
Figure 4 is an elevation of a detached baffle.

The intermediate rings 17 are spaced apart roughly about nine inches and are not necessarily secured to the rods because the fit is a very snug one since the rings, both the outside rings 11 and the intermediate rings 17, are drilled close to the inside surface in a jig and the rods are passed thru the rings without heating of either, being readily pressed in. The angle iron rings 10 are secured to the outside rings 11 in any desirable manner, for example, by the rivets 18 and I find it convenient to have the cylindrical inside surface of the angle iron touch the outside surface of the rods. I may, and sometimes do, peen the rings as indicated at 20 in Figure 3 in order to make a somewhat more firm connection which might be advantageous in case of accident even tho in normal use there is no tendency for the rings 17 to approach each other because of the great number of rods used and the accurate fit.

I have found $\frac{5}{32}$ of an inch to be a very satisfactory size for the brass rods and likewise of the drills for making the holes for the rods and the spacing apart of the rods will be varied to suit the different objects to be washed; for example, for washing peas or string beans the clearance between rods may be roughly $\frac{5}{32}$ of an inch, the same as the diameter of the rods, while for lima beans the clearance should be decreased to about ⅛ of an inch and it should be still further decreased to about $\frac{3}{32}$ of an inch for corn. The figures just stated are illustrative only and are not in any way to limit the scope of the claims, but it will be noted that when a given figure is duly chosen for the particular commodity that chosen figure is held to an exactness which approximates a thousandth of an inch, or even less.

The water discharge pipe 22 is provided with a plurality of jet openings 23 and adjacent the jet openings which may be spaced apart about as far as the distance between intermediate rings 17, is the curved wall 25 of a baffle 26 having an arcuate wall 27 to fit the outside surface of the pipe to which it is secured in any desired manner as, for example, by the screws 28. The curved or arcuate surface 25 of the baffle is preferably machined and polished in order to create a thin apron or curtain of water about a thirty-second of an inch thick. Should the surface be flat or not machined, the spray would be ragged but where the jet of water is discharged substantially tangentially against a smooth curve, as in the present case, the film of water becomes practically a single sheet extending across the sieve, the several curtains of water merging before reaching the rods of the sieve. The usual pressure of the water is such as to cause the curtain of water to wash the vegetables thoroughly without any damage whereas the same pressure in a jet spray would tear, break, and injure the food. While not essential, excellent results are had by having the curtain of water at an angle of about 45° this giving better results than when the curtain meets the periphery in a vertical or almost vertical plane.

The word "thru" in the claims implies that the small vegetables pass directly through the thickness of the curtain of water and not that they pass along the curtain of water in the direction of its breadth. The word "curtain" implies that the body of water is unbroken, that is, the body of water is not ragged as by the formation of drops.

What I claim is:

1. In combination, an elongated cylindrical sieve comprising a plurality of drilled rings greater in diameter than two feet and a plurality of rods cold pressed thru the drilled holes and spaced apart not greater than a fifth of an inch with a tolerance of one per cent variance in spacing, a water pipe within the sieve having jet openings therein, and baffles secured to the pipe adjacent the jet openings and so positioned as to project a continuous curtain of water at an angle of 45° against the bars of the sieve.

2. In a device for cleaning small vegetables such as corn, peas and beans, the combination with a water pipe having a plurality of alined and parallel jet openings therein, of a plurality of alined baffles one for each jet opening, each baffle comprising a fan shaped blade and an integral curved attaching portion, said blade having an arcuate machined portion for spreading the stream from the jet opening into a curtain or sheet of water merging with the similar curtains or sheets of water from other baffles.

3. In combination, an elongated cylindrical sieve comprising a plurality of drilled rings and a plurality of rods cold pressed through the drilled holes and spaced apart not greater than a fifth of an inch with a tolerance of one per cent variance in spacing, a water pipe extending longitudinally through the sieve and having jet openings therein, and baffles secured to the pipe adjacent the jet openings and so positioned with respect to each other as to project a continuous curtain of water against the bars of the sieve.

CHARLES E. RIFE.